United States Patent [19]

Shepard et al.

[11] Patent Number: 5,189,778
[45] Date of Patent: Mar. 2, 1993

[54] DRUM RECYCLING SYSTEM

[75] Inventors: John K. Shepard, Bolingbrook; Thomas P. Vander Sanden, Tinley Park; Arthur R. Tomczak, Chicago, all of Ill.; Lawrence E. Renck, Hartsville, S.C.

[73] Assignee: Sonoco Products Company, Hartsville, S.C.

[21] Appl. No.: 802,925

[22] Filed: Dec. 6, 1991

[51] Int. Cl.⁵ .............................................. B23P 19/04
[52] U.S. Cl. .................................. 29/426.4; 29/564.3
[58] Field of Search ............... 29/33 R, 564.1, 564.3, 29/564.7, 566.1, 426.1, 426.4, 426.2, 402.03, 402.07, 705, 402.05; 83/301, 302, 408; 241/101.4, 101.2

[56] References Cited

U.S. PATENT DOCUMENTS

| | | | |
|---|---|---|---|
| 1,484,728 | 2/1924 | Lund | 43/302 X |
| 2,203,738 | 6/1940 | Nash | 83/302 |
| 3,110,208 | 11/1963 | Mitchell, Jr. et al. | 83/302 |
| 3,217,988 | 11/1965 | Lightfoot et al. | 83/408 X |
| 3,473,587 | 10/1969 | Nishimura | 241/101.4 |
| 3,624,680 | 11/1971 | Evans | 29/402.03 |
| 3,689,973 | 9/1972 | Leenaards | 29/426.4 |
| 3,734,043 | 5/1973 | Rosenbloom | 29/402.05 |
| 4,091,697 | 5/1978 | Cailey | 83/408 |
| 4,124,169 | 11/1978 | Hatanaka | 241/101.4 |
| 4,422,581 | 12/1983 | Chryst | 241/66 |
| 4,627,580 | 12/1986 | Marbach | 241/101.4 |
| 4,726,535 | 2/1988 | Snyder | 29/705 X |
| 4,782,729 | 11/1988 | Mathot | 83/408 |
| 4,802,272 | 2/1989 | Beaudrie | 29/407.07 |

Primary Examiner—William Briggs
Attorney, Agent, or Firm—Dennison, Meserole, Pollack & Scheiner

[57] ABSTRACT

A system for reducing a paperboard drum to recyclable components including a cutter assembly receiving and rotating the chime end of a drum and severing the sidewall from the chime. A pair of pivot arms subsequently engage the drum header and sidewall and effect a general axial shifting thereof for partial disengagement of the released chime for subsequent manual removal of the chime and header. The resultant drum sidewall is guided, for movement on a helical path, into a chopper assembly which cuts the sidewall into a continuous helical strip which is immediately chopped into short lengths for disposal.

28 Claims, 7 Drawing Sheets

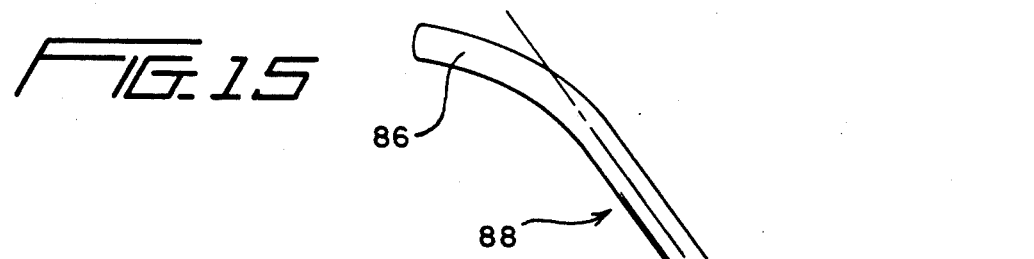
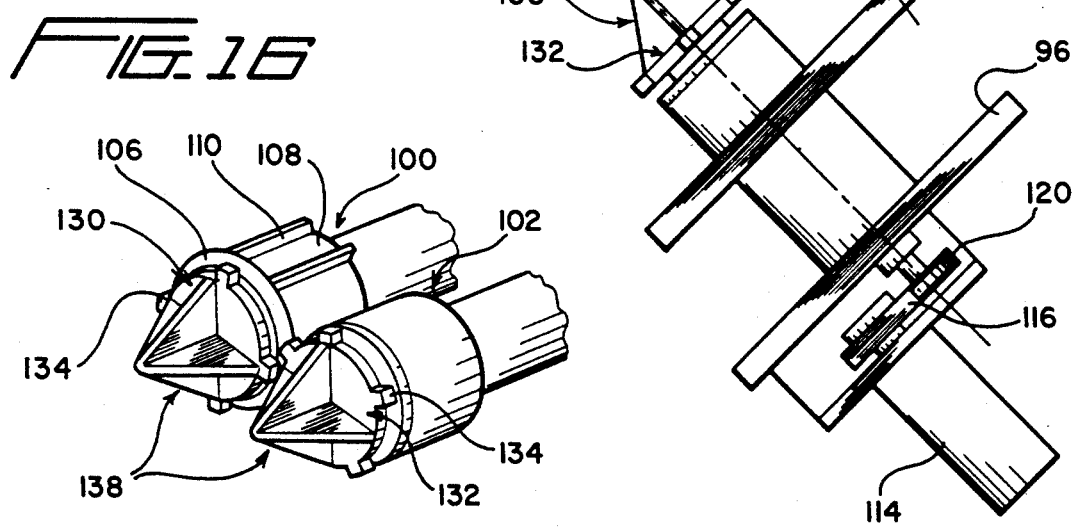
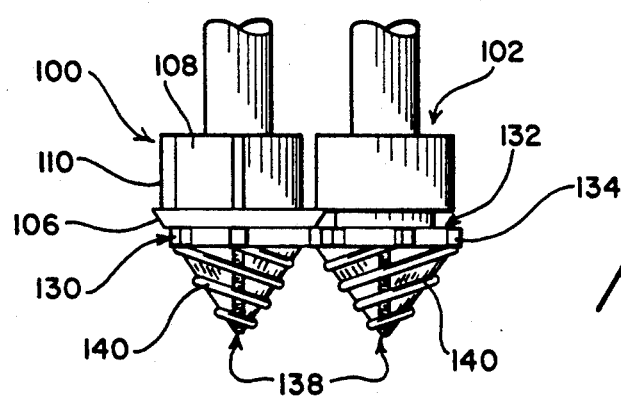
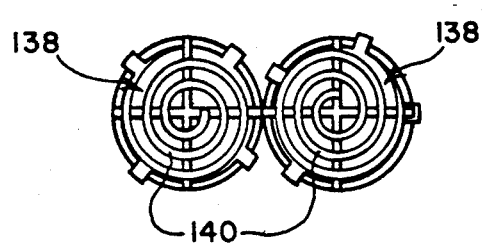

DRUM RECYCLING SYSTEM

BACKGROUND OF THE INVENTION

The invention broadly relates to fiberboard or paperboard shipping containers, and more particularly with the disposal of such containers after use.

Paperboard shipping containers or drums are conventionally a single use item which, when emptied, are disposed of. This disposing of the emptied drums is a substantial problem both because of the bulk of the drum itself and the fact that tens of thousands of such drums are continually moving in commerce.

The principal means of disposal has included landfills and incineration. Landfills are in increasing short supply, environmentally undesirable and wasteful of any benefits which might be derived from the drum material. Incineration may have some benefit when incorporated into a heat generating plant. However, incineration destroys the drum material, may be incomplete insofar as the metal components of the drum are concerned, and could also give rise to environmental concerns of the type involved with any incineration operation.

The preferred manner of disposal, inasmuch as the product is principally constructed of paperboard, would be to recycle the material of the drum. In light of the vast number of drums used and disposed of daily, the amount of material which can theoretically be recycled is enormous and would result in substantial savings in paperboard in particular. The environmental benefits thereof will be readily recognized. However, the recycling of paperboard drums as currently practiced has for the most part involved the use of large, costly crushers, shredders or grinders which have been found to have little economic practicability for a variety of reasons, including cost of the apparatus, the expenses involved in operation of the apparatus, and the relative ineffectiveness of the apparatus.

SUMMARY OF THE INVENTION

The present invention involves both apparatus and process for the effective, practical and economic recycling of paperboard drums, including both the paperboard and metal components thereof.

The apparatus which performs the actual controlled destruction of the drum is a compact assembly easily transported, for example for temporary field use, or conveniently installed in a relatively small area, for example directly in or adjacent a plant which normally receives large shipments of product containing drums. Such conveying means as considered appropriate for the particular installations may be provided for an automated introduction of the drums and a removal of the recyclable chopped material.

The destruction of the drum and recovery of the materials thereof is basically a two-step operation, including dechiming and chopping. Initially, the drum is longitudinally introduced into a dechimer unit which releases the edge chime from one end thereof by severing the fiberboard wall immediately inward of the chime bead or crimp, with the chime and/or the drum wall being deformed to initiate a separation or partial separation of the chime. The chime is then either mechanically or manually stripped from the drum. This procedure is then repeated at the other end of the drum as necessary if a second chime is utilized.

The metal chimes, so separated, retain only a minute amount of paperboard which will not interfere with the recycling of the metal.

The cylindrical paperboard drum, subsequent to removal of the chimes, is introduced into the chopper unit of the apparatus for engagement of the leading edge of the drum between a pair of wheels which engage and continuously cut the drum along a helical path, forming a continuous strip which, immediately upon a severing thereof, is chopped into short lengths and vertically dropped onto a discharge conveyor for lateral disposal. Provision is made, through guide bar means and drum wall gripping elements for automatically engaging and moving the leading end edge of the drum wall into the cutting and chopping wheel assembly and encouraging such movement throughout the full longitudinal extent of the drum including the trailing end portion thereof for an automatic and complete chopping of the entire drum wall regardless of irregularities therein as might result from deformation of the body wall during chime removal.

Other objects, features and advantages of the invention are deemed to reside in the details of construction and operation as more fully hereinafter presented.

BRIEF DESCRIPTION OF THE DRAWINGS

FIG. 15 is a side view of the apparatus of FIG. 13;

FIG. 16 is a perspective detail of the chopper components;

FIG. 17 is a plan view of the chopper components with modified infeed means; and FIG. 18 is a front view of the chopper components of FIG. 17.

DESCRIPTION OF PREFERRED EMBODIMENTS

Figure 1:
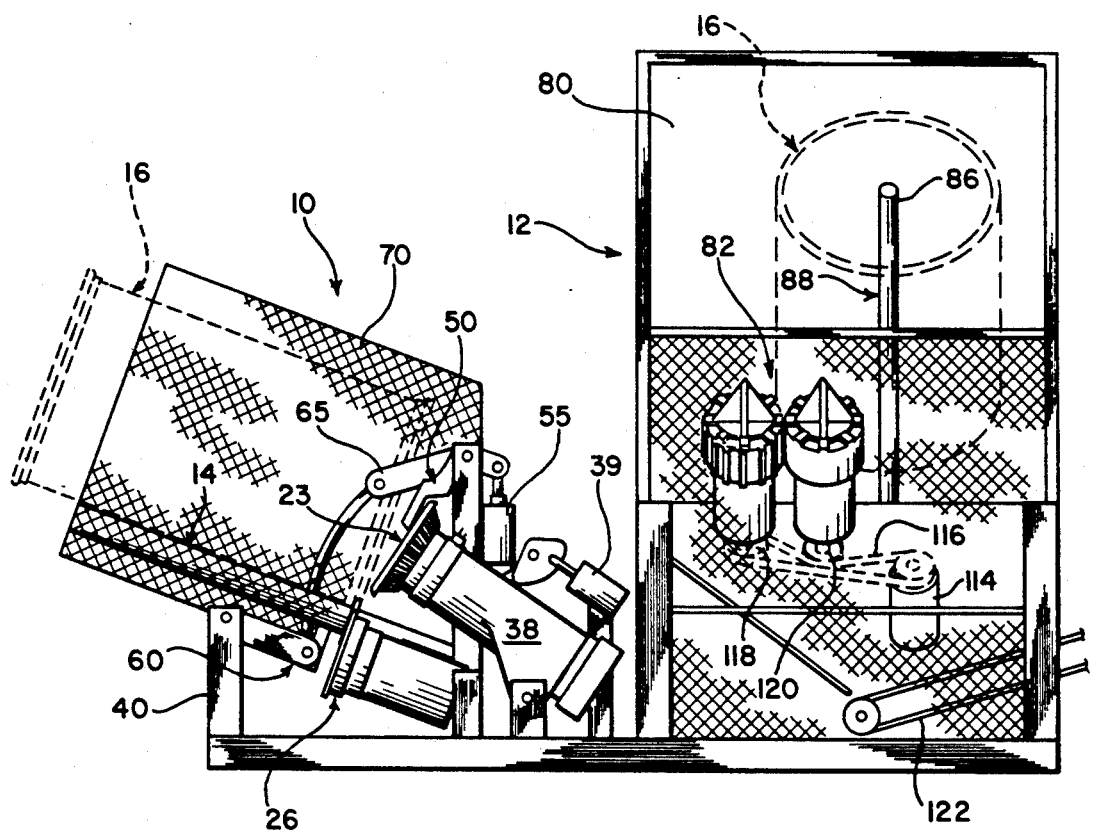
FIG. 1 is an elevational view of the apparatus of the invention including both the dechimer and the chopper.

Referring now more specifically to the drawings, the recycling system for fiberboard of paperboard drums, as illustrated in FIG. 1, includes two units, the dechimer 10 and the chopper 12 positioned for sequential use in a process of reducing a drum to its salvageable components. This includes a physical reduction of the paperboard to small pieces readily and economically packed and shipped to appropriate facilities for reprocessing into raw material. As illustrated, both units 10, 12 can mount to a common base and, because of the compact natures thereof, may be portable.

The dechimer 10 includes a pair of laterally spaced parallel drum support rollers 14 inclined downwardly and inwardly for receiving, positioning and inwardly guiding the individual drums 16. The rollers 14 have annular flanges 18 toward the inner ends thereof which are received within the exterior chime groove 20 (FIG. 6) for support, stabilization and positioning of the drum 16 as the chime 22 is aligned for separation. The actual cutting of the sidewall for separation of the chime is effected by an upper cutter assembly 23, including a cutter blade 24, and a lower backup wheel 26 aligned therewith. The backup wheel 26, noting FIG. 6, includes an annular flange 28 which engages within the chime groove 20, a cylindrical portion with an annular surface 30 which directly supports the chime 22 immediately above the chime groove 20, and an annular shoulder or break edge 32 at the end of the support surface 30 remote from the flange 28 and located immediately below the beaded upper end or crimp 33 of the chime 22. The backup wheel 26 can either be driven to assist in rotation of the drum as the sidewall is severed from the chime, or can be freely rotatable with the drum 16 driven by the cutter blade 24 and associated components. Depending on the diameter of the drum 16, the chime and sidewall, during the actual severing, will be supported on the backup wheel alone, or along with one or both of the support roller flanges 18.

The backup wheel 26 is on a fixed position axis for rotation thereabout. The cutter blade is on a pivotally adjustable axis for engagement of the chime area of the drum subsequent to a positioning of the drum on the backup wheel 26. The cutter blade assembly 23, in addition to the cutter blade 24 itself, includes an annular cylindrical or slightly rearwardly tapering drive plate 36 immediately rearward of the cutter blade 24. The drive plate 36 includes a toothed or serrated periphery radially inward of the cutting edge of the blade 24. The blade 24 and drive plate 36 are affixed for simultaneous rotational driving thereof on the pivotally adjustable support arm 38 which, in one contemplated embodiment, can incorporate a hydraulic drive motor for the blade 24 and drive plate 36. The support arm 38 is pivotally mounted, at the end thereof remote from the cutter assembly, to the structural framework of the dechimer 10, generally designated by reference numeral 40 and formed of such structural components as required to support the various operating components of the invention. A power means for pivoting the arm 38 to engage blade 24 and drive plate 36 is schematically suggested at 39.

Figure 3:
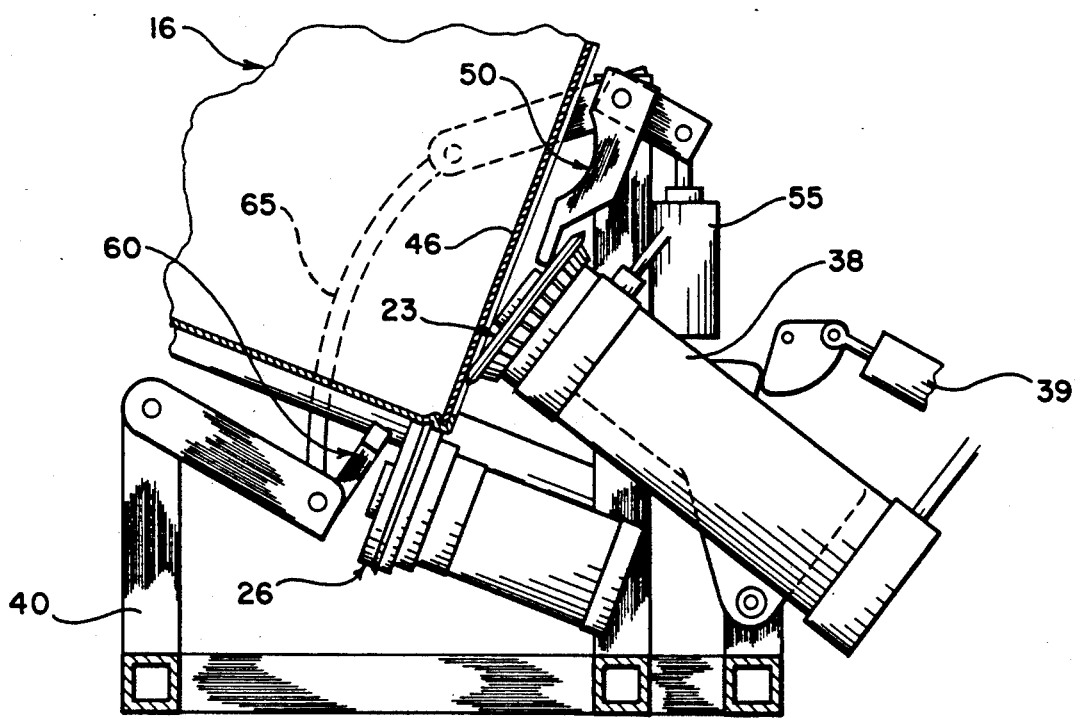
FIGS. 3, 4 and 5 sequentially illustrate steps in removal of a chime.
Figure 4:
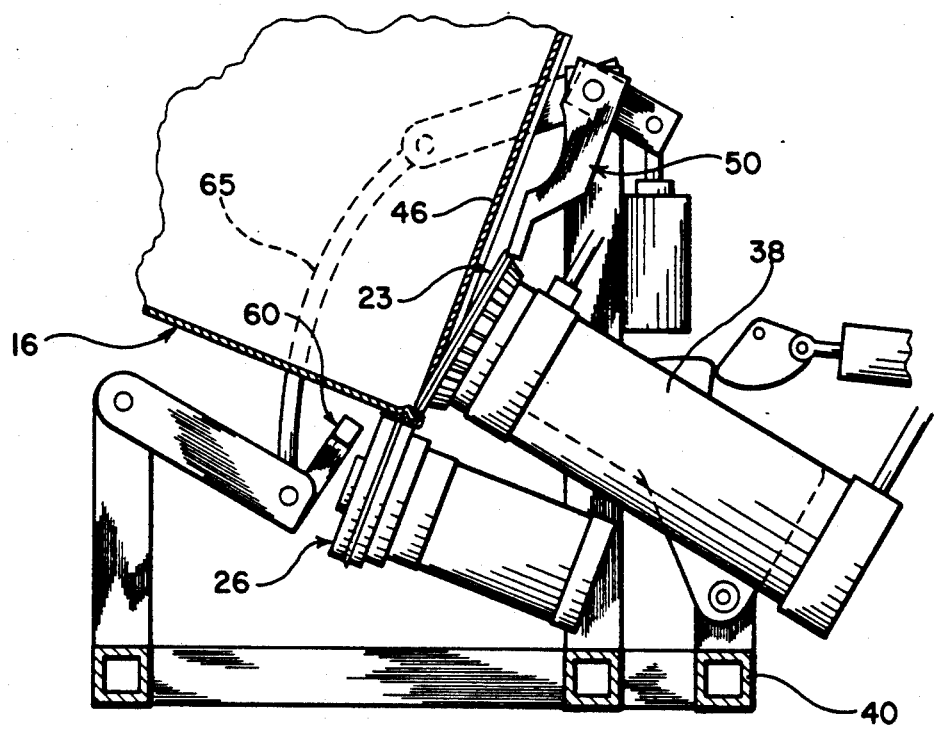

The cutter blade 24 through the pivoted support arm 38, moves between a retracted position allowing introduction and positioning of the drum end as illustrated in FIG. 3, and an engaged position, noting FIG. 4.

It is particularly essential, for an effective and economical recycling of the steel chime, that the chime 22 be removed with minimal sidewall residue attached thereto. Accordingly, and noting FIG. 6, as the cutter blade 24 and drive plate pivot downwardly into cutting engagement with the received drum 16, the edge portion of the blade 24 engages immediately below the chime crimp 33 with the periphery of the drive plate also engaging the chime crimp at the inner lower periphery of the crimp. Both the blade and drive plate are oriented to abut against and forcibly engage the crimp 33, causing a slight uncurling and radial outward unfolding of the crimp portion of the chime 22 about the break edge 32 of the backup wheel 26. In this manner, a maximum amount of the paperboard wall is exposed to the cutter blade 24 with minimal sidewall residue remaining in the chime crimp itself. As noted from the drawings, the actual severing is effected by the edge of the cutter blade engaging through the paperboard layers and contacting the inner face of the chime 22 adjacent and immediately inward of the break edge 32 about which the crimp is outwardly bent.

Figure 6:
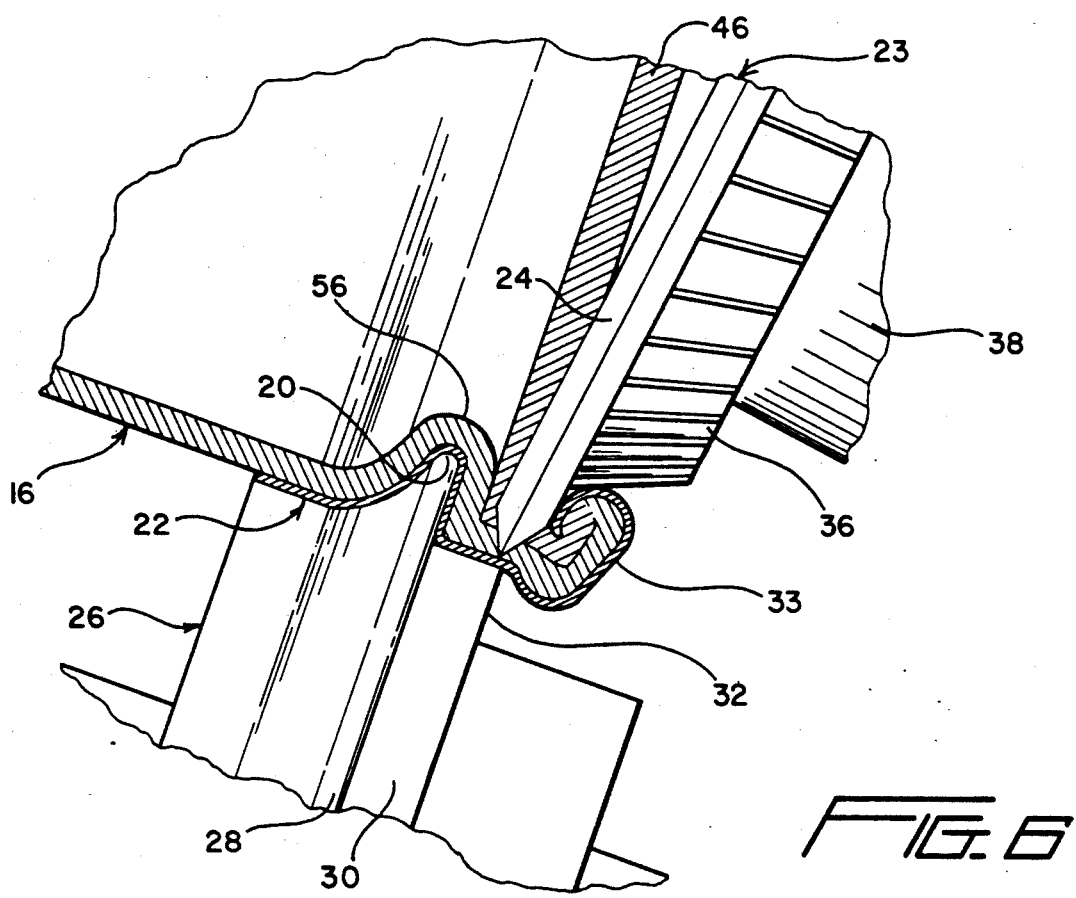
FIG. 6 is an enlarged cross-sectional detail illustrating the cutter blade assembly in sidewall severing engagement with the drum.

With continued reference to FIG. 6, it will be noted that the drum end illustrated is the bottom of the drum and includes the bottom header 46 of paperboard or the like which is, about the peripheral edge thereof, simultaneously severed during the dechiming operation of the cutter blade 24. The dechiming of the opposite or top end of the drum is similarly effected However, inasmuch as the top crimp will not have a header, such as 46, crimped therein, there will be a slightly lesser spread or bend of the crimp from cutter penetration.

Referring again to the dechiming of the bottom chime, provision is also made for a freeing of the edge severed bottom header 46 and an initial physical separation of the drum body and chime. These procedures are effected after at least one and normally two complete revolutions of the drum between the engaged cutter blade 24 and backup wheel 26 to insure a complete severing of the paperboard material at the chime. As previously suggested, revolution of the drum during the cutting operation can be effected by a simultaneous rotational driving of the backup wheel 26 and cutter assembly, or merely by a rotational driving of the cutter blade 24 and associated drive plate 36 which, through the serrated periphery thereof, is in driving engagement with the chime crimp 33.

Figure 10:
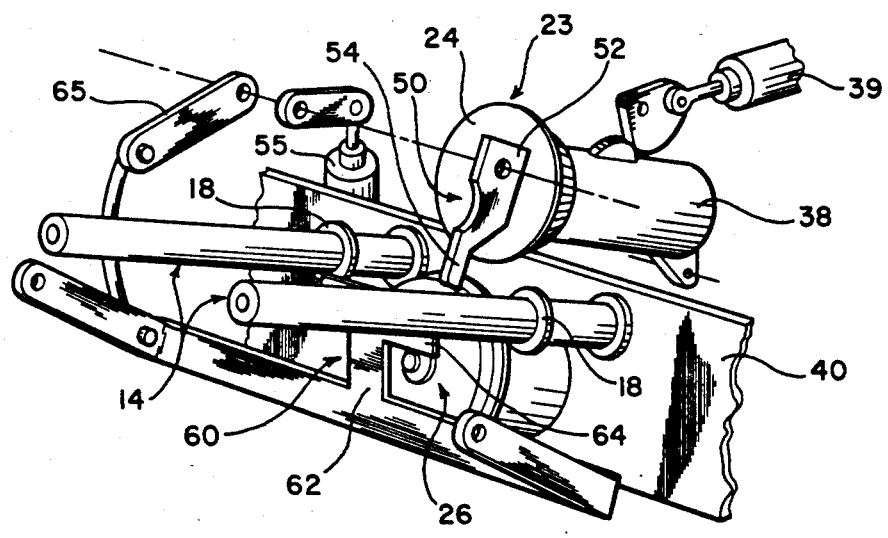
FIG. 10 is a schematic perspective view of the operating components of the dechimer.
Figure 2:
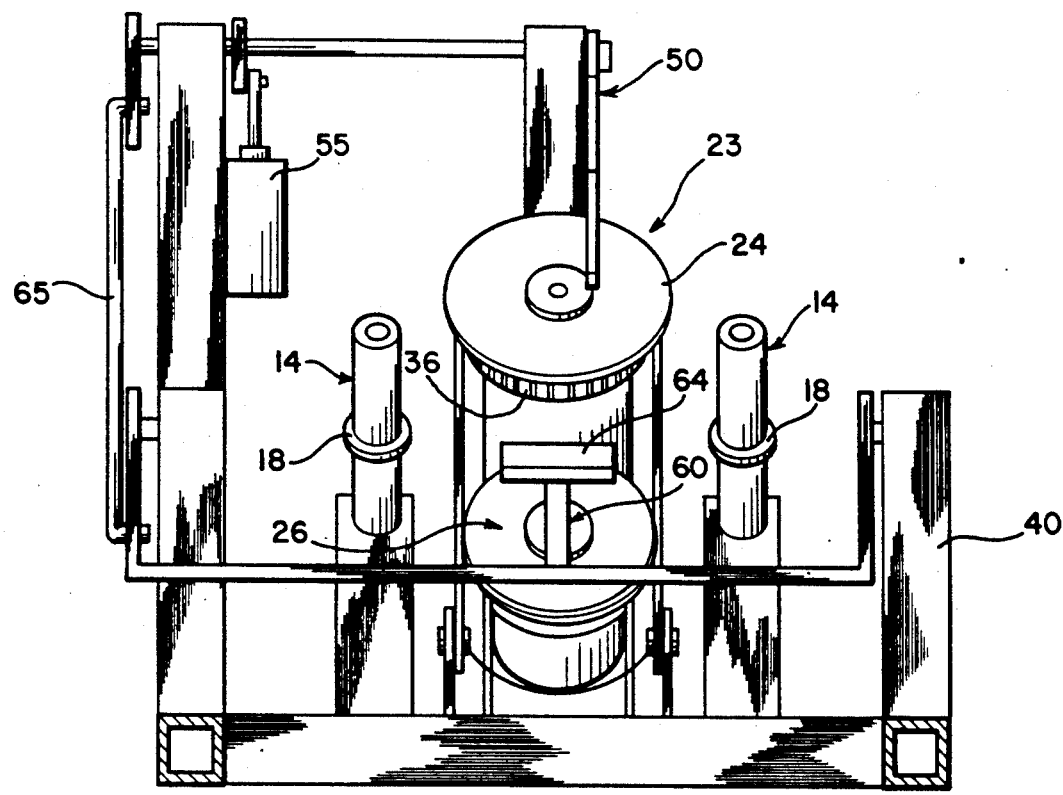
FIG. 2 is an elevational view of the dechimer from the infeed end thereof.
Figure 5:
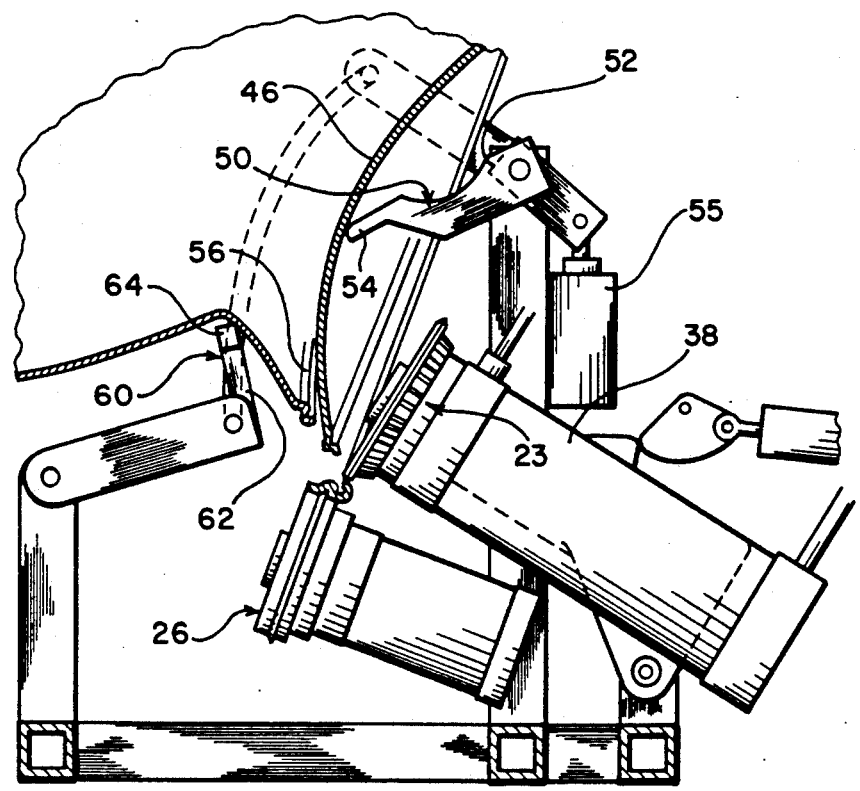

Noting FIGS. 5 and 10, and with reference to a freeing of the edge severed bottom header 46, an elongate pusher arm 50, generally aligned with the axis of an introduced drum and vertically spaced above the cutter blade and backup wheel, includes an inner end 52 pivotally mounted to the support structure 40 and a free forward end 54. The pusher arm 50, prior to actuation thereof, depends generally vertically from the pivot end 52 thereof inward of the plane of the inner end of a mounted drum so as to not interfere with the positioning and rotation of the drum during the severing operation. After the severing operation, the pusher arm 50, through any appropriate means, such as power ram 55, is forwardly and upwardly swung to engage the forward end portion 54 thereof with the now severed header 46 and produce an inward bowing of the header. The length of the pusher arm 50 and degree of pivotal movement is to be such as to sufficiently inward bow the header 46 to push the peripheral severed edge thereof, along at least a major portion of the periphery thereof, inward beyond the internal annular sidewall rib 56 formed during the initial mounting of the chime as a support component for the adjacent header.

In order to initiate separation of the chime from the sidewall, which remains partially engaged particularly in light of the exterior chime groove 20 and sidewall rib 56, a creaser arm 60 is positioned between the bottom support rollers 14 forward of the cutter assembly. The creaser arm is mounted to the structural framework for a vertical pivoting of the rearwardly extending arm between the support rollers 14. The rear portion of the creaser arm includes a vertically directed post 62 affixed thereto and with an enlarged or T-head 64 thereon. In the downwardly retracted position of the creaser arm 60, the upper end of the post 64 is positioned sufficiently below the support rollers 14 as to not interfere with the free introduction and removal of the drums. After the severing operation of the cutter blade 24 and backup wheel 26, and after the pusher arm 50 has forwardly pivoted to nearly its maximum extension, the creaser arm 60 upwardly pivots, moving the post end 64 thereof upward and forward into engagement with the paperboard sidewall of the drum 16 adjacent but in inwardly spaced relation to the inner edge of the chime 26 with sufficient force to inwardly crease the sidewall and partially disengage the sidewall groove from the chime groove, note FIG. 5. At the same time, the forward swinging of the creaser arm includes a substantial directional component urging the creased sidewall axially away from the chime which remains positively gripped between the cutter blade 24 and backup wheel 26. The creaser arm is then retracted, along with a retraction of the pusher arm 50 and an upward pivotal release of the cutter to allow for removal of the drum.

As desired, and noting FIG. 10, as showing one operational arrangement, the pusher arm and creaser arm can be link connected, schematically shown at 65, for operation from a common power source such as ram 55. Alternately, the creaser arm can be independently controlled. Further, while it is preferred that the creaser arm 60 operate as the pusher arm 50 completes the inward pushing of the drum bottom or header, both the pusher arm and creaser arm can act simultaneously or, if demanded by particular circumstances, the creaser arm can actually commence the creasing operation prior to the pusher arm releasing the severed header 46.

After retraction of the pusher arm 50 and creaser arm 60, and release of the cutter assembly, the drum 16, with the partially disengaged chime and bottom header, is manually removed from the dechimer after which the substantially free header and chime are easily manually stripped away from the fiberboard sidewall. The drum is then reversed and the chime removed from the opposite end thereof. If this opposite end does not include a header, operation of the pusher arm 50 will not be required. The pusher arm 50, depending upon the automated nature of the equipment, may either be disengaged or continued to operate as a part of the sequence of operation of the apparatus.

Figure 7:
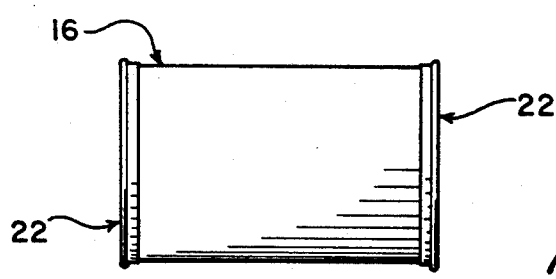
FIGS. 7, 8 and 9 are schematic illustrations of the drum with end chimes, the drum with one end sidewall severed and the chime partially removed, and the drum with both end chimes removed.
Figure 8:
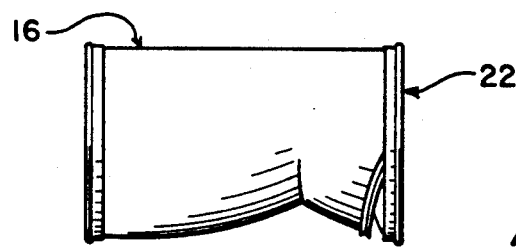
Figure 9:
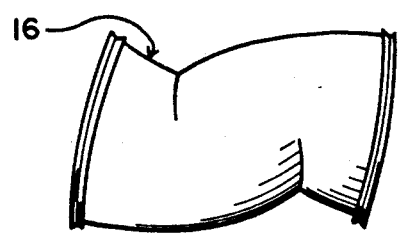

FIGS. 7, 8 and 9 sequentially illustrate a drum prior to removal of the chimes, with one chime partially removed and the sidewall creased, and with both chimes completely removed.

As noted in FIG. 1, the dechimer is preferably enclosed within a protective enclosure or guard 70 with an open forward end through which the drums are introduced and removed. This guard is mounted directly on the structural framework. However, separate fence-type guards can be provided which could facilitate access to the actual operating assembly for ease of operation.

Figure 11:
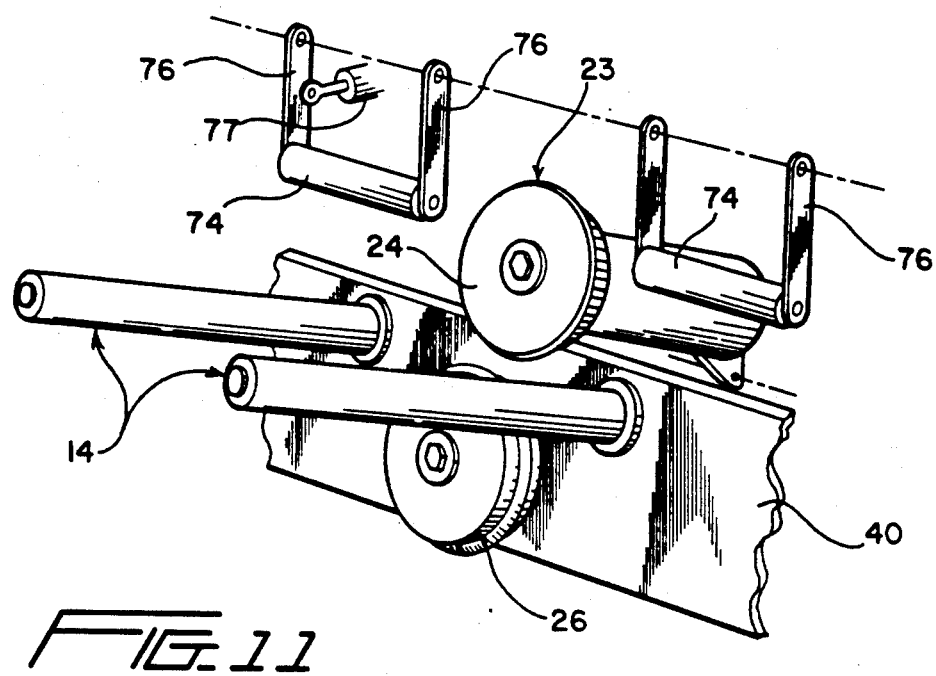
FIG. 11 is a schematic perspective of the operating components of the dechimer with alternate means for initiating separation of the chime and drum sidewall.
Figure 12:
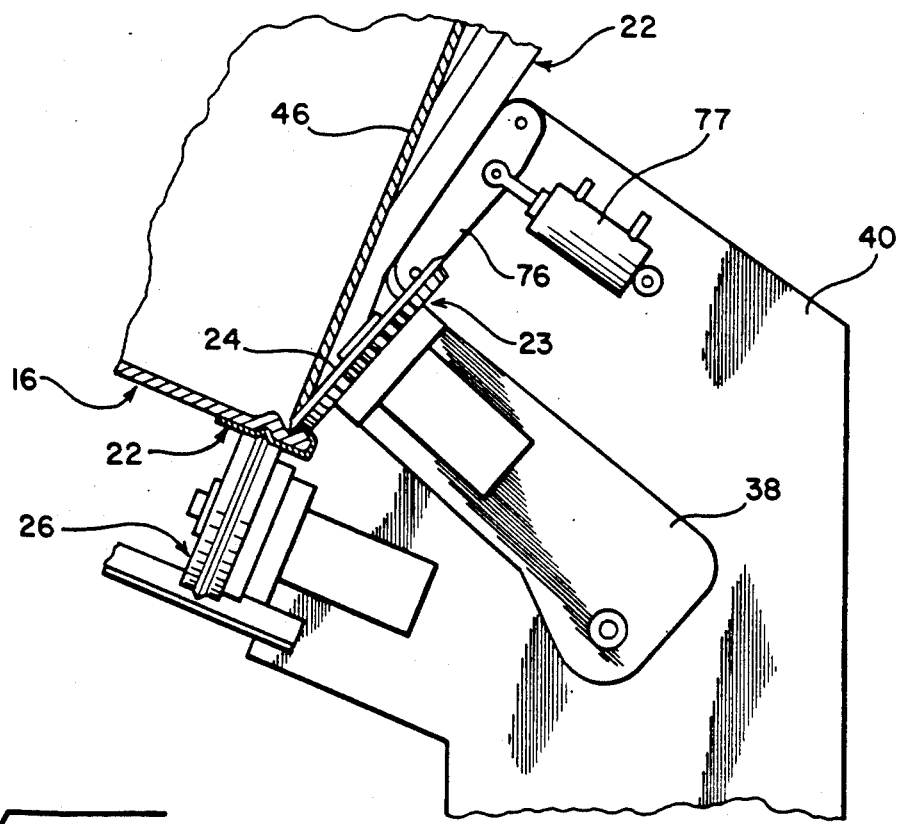
FIG. 12 is a side elevational view of the components of FIG. 11 with a drum shown in section.
Figure 13:
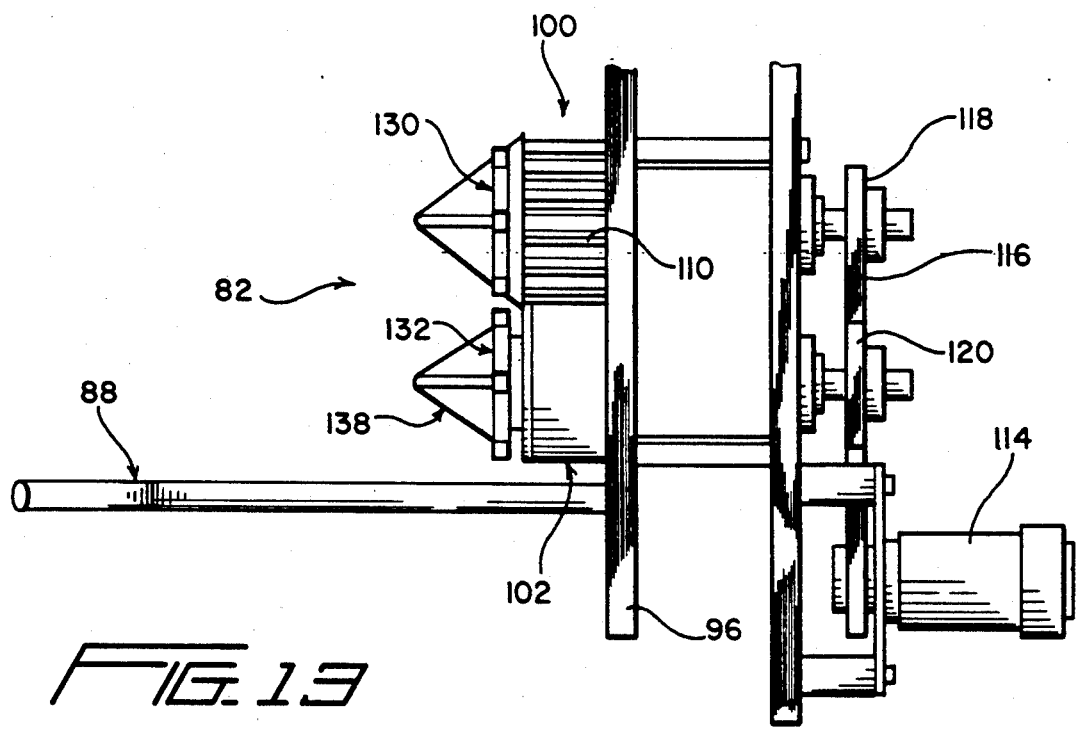
FIG. 13 is a top view of the chopper operating components.

With reference to FIGS. 11 and 12, an alternate system for an initial disengagement of the severed sidewall and chime is illustrated. In this embodiment, a pair of pusher rollers 74 are aligned to opposed sides of the cutter blade 24 vertically thereabove to align generally diametrically across a received drum at mid-height. The rollers 74 are positioned to assist in guiding and properly positioning an introduced drum for engagement with the backup wheel 26 and the cutter blade 24. Each roller 74 is rotatably mounted between the free ends of a pair of arms 76 which are in turn pivoted to the structural framework 40.

After an initial severing of the sidewall from the chime by the cutter blade 24, the rollers 74, moved by appropriate power means schematically shown at 77, and while the chime is still gripped between the cutter blade and backup wheel 26, forcibly swing forwardly and engage the chime with continued forward movement of the rollers 74 forcibly moving the sidewall away from the retained chime and simultaneously inwardly deflecting the severed bottom header. Such movement, suggested in FIG. 12, has been found to effectively free the bottom header and bend the chime as indicated to effect a positive disengagement or gapping between the chime and sidewall. This in turn provides a ready means for manually grasping and stripping the chime from the sidewall after removal of the drum from the dechimer assembly, which removal is of course preceded by a release of the chime by a retraction of the cutter blade.

Figure 14:
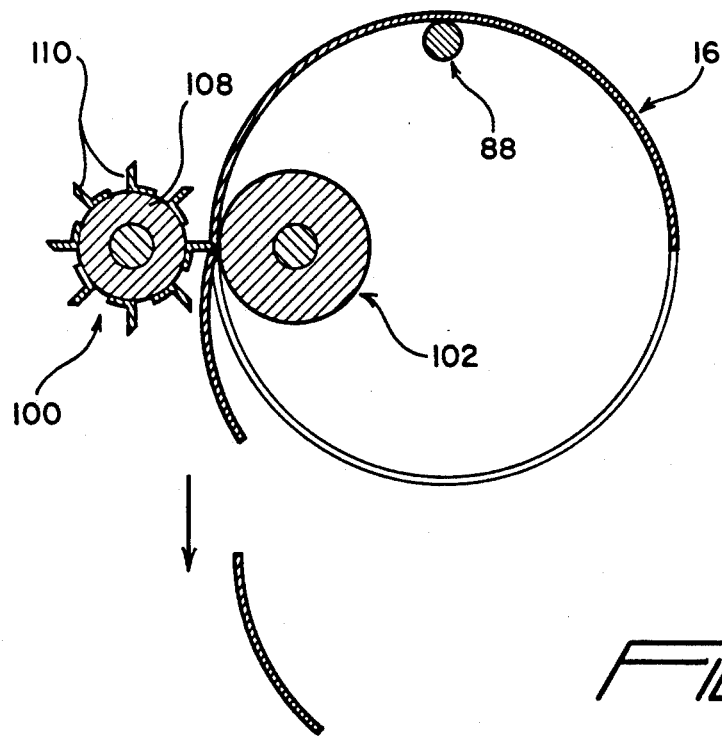
FIG. 14 is a cross-sectional detail illustrating the orientation of the drum during the cutting and chopping thereof.

After a removal of both chimes, the drum 16, which now consists only of the cylindrical drum sidewall, is introduced into the chopper unit 12. The inlet 80 of the unit 12 is elevated and inclined for a downward introduction of the drum the enclosed chopper assembly 82. The drums can be introduced manually or fed thereto by an infeed conveyor. The drum 16, introduced manually or automatically, will engage over the laterally directed free end portion 86 of an elongate guide rod 88. The lower or inner end portion 90 of the guide rod 88 is rigidly mounted to a portion of the support structure 96 of the chopper unit 12 above the chopper assembly 82 and slightly to one side thereof whereby the chopper assembly 82, noting FIG. 14, is at approximately a nine o'clock position on a guide rod supported drum.

The chopper assembly 82 includes a chopper wheel 100 and an anvil wheel 102 mounted on upwardly inclined parallel axes extending toward the open or inlet end 80 for reception of the leading edge of an introduced drum guided by the guide rod or bar 88. In order to ensure a proper engagement of the leading drum edge with the chopper unit 82, the guide rod 88 will normally be upwardly angled, from the mounted end thereof, preferably at approximately 2 to 15 degrees relative to the axes of the wheels 100 and 102.

The chopper wheel 100 basically consists of a circular cutter plate or blade 106 with a chopping cylinder 108 immediately therebehind and coaxial therewith. The chopping cylinder 108 includes a plurality of longitudinally extending spaced projecting chopping blades 110. The cutter blade 106 and chopping blades 110 cooperate with the adjacent anvil wheel to helically cut the drum into a continuous strip of predetermined width no greater than the length of the chopping blades 110 for an immediate sequential severing of the cut strip into small pieces or segments.

The shafts of the chopper wheel 100 and anvil wheel 102 are appropriately mounted on the structural framework 96 and, as an illustrated example, may be driven from a single power source 114 by a common drive belt 116 engaged about shaft mounted pulleys 118 and 120 in a manner as to, noting FIG. 1, drive the wheels inwardly and downwardly relative to each other whereby the chopped segments are discharged directly downward for disposal, for example by an upwardly and outwardly inclined discharge conveyor 122.

In order for the chopper unit 12 to be practical, it is necessary that the drum be automatically engaged by the chopper assembly 82 at the leading end of the drum, and regardless of irregularities thereon, and cut in a continuous helical strip to and through the following end of the drum. The angling of the guide rod 88, for example at approximately 7 degrees from the axes of the chopper unit wheels 100, 102, orients the drum at the desired angle to the chopper and anvil wheels. In order to ensure a proper initial engagement with the leading end of the drum, which will normally be quite irregular as a result of the annular wall groove and rib remaining upon removal of the chime and the longitudinal crease defined in the drum sidewall by the creasing arm, specific cooperating infeed means are associated with the wheels 100, 102.

The infeed means, in a preferred embodiment, includes a pair of circular plates 130, 132 respectively affixed to the forward faces of the chopper and anvil wheels 100, 102 coaxial therewith. These plates 130, 132 include circumferentially spaced radially projecting teeth 134. The teeth 134 are relatively widely and randomly spaced about each of the circular plates 130, 132 and are of varying radial projection to provide varying clearances therebetween of between approximately one-half the thickness of the drum sidewall to two times the thickness of the drum sidewall. Thus formed, a leading end of a drum sidewall brought into the vicinity of the space in between the toothed plates 130, 132 by the guide rod 88 will, at one point during the inward and downward rotation of the infeed plates 130, 132 be gripped by the teeth and inwardly drawn, at the angle defined by the guide rod 88, into and between the chopper wheel and anvil wheel 100, 102 to produce the desired helical cut and chopping.

The automatic infeeding of the drum 16 can be further enhanced by incorporating conical or pyramidal forwardly projecting guides 138 on and projecting forwardly from the forward faces of the toothed plates 130, 132. These guides, as illustrated, can be defined by four right angle plates meeting at a common apex and radiating outward from a common central axis to define a series of opposed inwardly converging edges, between the plates 130, 132 for an enhanced gripping of the drum wall.

As a further variation, and noting FIGS. 17 and 18, the pyramidal infeed guides 138 can each include a spiral guide rib 140 thereon and thereabout from the leading apex to the base thereof at the corresponding toothed plate 130, 132. The ribs 140 are so spiraled as to, upon a rotation of the chopper and anvil wheels 100, 102, grasp and forcibly infeed the leading edge portion of the drum 16 regardless of irregularities thereon, creases therein or damage thereto. As desired, the ribs 140 can include a gripping surface or gripping lugs thereon. The infeeding action, particularly that of the toothed plates 130, 132 continues throughout the full extent of the drum as a supplement to the inherent infeeding action effected by the cooperating chopper and anvil wheels 100, 102 during the actual helical cutting and chopping.

As illustrated, the chopper subassembly is also preferably enclosed within a protective guard or cage.

The drum recycling apparatus enables an effective and economical recycling of fiber drums with minimal labor through a unique sequence of steps. The basic procedure includes the removal of the metal end chimes with minimal fiber reside remaining within the chime. This is effected by a forcible engagement of the cutter blade assembly with the chime crimp to produce a partial opening of the chime crimp and an outward folding of the chime to engage the cutting wheel as close as possible to the extreme edge of the drum sidewall.

The dechiming operation, subsequent to a severing or cutting of the sidewall, and end header if present, from the chime further provides for an automatic inward pushing or bowing of the end header to free the header. Subsequently, or at approximately the same time, the sidewall is inwardly creased adjacent the severed chime to both inwardly deflect the sidewall away from the chime which remains gripped by the cutting wheel and backup wheel, and rearwardly or axially urge the creased sidewall partially out of the chime or chime hoop. The drum, with the end header and chime now merely loosely retained to the sidewall, is removed from the dechimer and manually stripped of the loose chime and header.

The drum, which now consists merely of the fiberboard or paperboard sidewall, is introduced, either manually or from an infeed conveyor, onto a guide rod angled inwardly and downwardly into the chopper assembly, and more specifically a pair of cooperating chopper and anvil wheels. The angle of introduction of the drum is such as to feed the generally circular leading end of the drum at an angle between the wheels for a continuous spiral or helical feeding of the drum therebetween. In moving through the wheels, the drum is slit into a continuous helical strip which is immediately chopped into predetermined small lengths or segments which discharge downwardly for subsequent disposal. The consistent size of the chopped segments are particularly desirable in allowing for an efficient baling and shipment of the compact material. The baled remainder or product of the dechiming and chopping apparatus, because of the compact nature thereof, is an improved product for disposal not only by recycling, but also in other manners such as in landfills or incinerators.

Among other features of particular significance is the positive grasping and infeeding of the leading end of the drum into the chopper unit which, in combination with the guide rod, ensures a proper orientation and positive engagement and movement of the drum wall into and through the chopper assembly regardless of edge or wall irregularities on the drum sidewall resulting from removal of the chimes.

The foregoing is considered illustrative of the various aspects of the invention. As modifications and variations based on the teachings of the invention will occur to those skilled in the art, the invention is not to be limited to the exact construction and manner of operation shown and described.

We claim:

1. Apparatus for use in the recycling of a paperboard drum having a paperboard sidewall with opposed peripheral end portions, and a metal end chime mounted on and continuously about each end portion; said apparatus comprising cutter means for cutting engagement with the drum sidewall peripherally thereabout sequentially at each end portion adjacent the chime for severance of the sidewall from the chime, separator means for acting against the sidewall to forcibly initiate separation of the severed sidewall from each chime for removal therefrom, and chopper means for engaging an end portion of the sidewall, after removal of the chimes, and for continuously chopping said sidewall into recyclable segments.

2. The apparatus of claim 1 including positioning means aligned relative to said cutter means for receiving and positioning a drum in engagement with said cutter means, said positioning means comprising a rotatable support for the drum as the sidewall is cut.

3. The apparatus of claim 2 including guide means aligned relative to said chopper means for receiving, aligning and introducing a drum sidewall to said chopper means.

4. The apparatus of claim 3 wherein said chopper means includes intake means for gripping and inwardly drawing a peripheral end portion of an introduced drum sidewall to said chopper means.

5. The invention of claim 4 wherein each drum chime includes a crimp at the outer extremity thereof confining the outer extremity of the corresponding peripheral end portion of the sidewall; said cutter means including drive means for engaging the chime crimp and rotatably driving the drum as the sidewall is severed from the chime.

6. The invention of claim 5 wherein the drum includes at least one end header peripherally secured within a chime crimp; said cutter means being adapted for cutting engagement with the end header adjacent the chime crimp simultaneous with cutting engagement with said drum sidewall for a simultaneous severance of the chime from the header, and pusher means selectively extendable for engagement with the end header and for forcibly initiating separation of the end header from the chime after severance of the sidewall.

7. The apparatus of claim 6 wherein said cutter means comprises a rotatably mounted backup wheel adapted to receive and rotatably support the chime of the drum, said backup wheel defining a break edge positionable axially inward of the chime crimp, said cutter means further including a cutter blade and drive plate, mounting means pivotally mounting said cutter blade and drive plate for movement between a first position retracted from said backup wheel to allow introduction of the chime of the drum therebetween, and a second cutting position with said blade adjacent said backup wheel and in severing engagement with the sidewall opposed from said backup wheel adjacent said break edge, said drive plate, in said second position, simultaneously forcibly engaging the chime crimp for downward deflection thereof about said break edge whereby severance of the chime is effected immediately adjacent the crimp with minimal sidewall material retained within the chime crimp.

8. The apparatus of claim 7 wherein said separator means includes a movably mounted separator arm forward of said cutter means, and means for moving said separator arm laterally relative to said cutter means into a cutter means engaged drum sidewall for effecting an inward creasing of the drum sidewall away from the chime and a corresponding axial movement of the sidewall away from the chime.

9. The apparatus of claim 8 wherein said pusher means comprises a pusher arm movably mounted laterally of said cutter means, and means for forwardly moving said pusher arm into forcible engagement with the drum end header subsequent to severance of the sidewall from the chime for an inward deflection of said end header away from the chime.

10. The apparatus of claim 9 wherein said chopper means comprises a rotatable chopper wheel and an adjacent counter rotatable anvil wheel, said chopper wheel including a forward sidewall slicing blade with a chopping cylinder immediately therebehind for sequential slitting of the sidewall into a continuous strip and chopping the strip into short segments.

11. The apparatus of claim 10 wherein said chopper wheel and anvil wheel rotate on parallel axes, said guide means comprising at least one guide rod laterally of and extending at an acute angle to said axes for guided introduction of the drum at an angle to the axes of the wheels for intersection of said chopper blade with the leading end of the drum sidewall at an acute angle thereto for subsequent slicing of said drum sidewall into a continuous helical strip.

12. The apparatus of claim 11 wherein said intake means are mounted on said chopper wheel and said anvil wheel forward of said chopper blade and include peripheral sidewall gripping means for engaging and inwardly feeding the sidewall between said chopper wheel and said anvil wheel.

13. The apparatus of claim 12 wherein said intake means comprises gripping teeth on each of said chopper wheel and said anvil wheel radially directed for cooperating engagement with the sidewall.

14. The apparatus of claim 13 wherein said intake means further include conical guides on said chopper wheel and said anvil wheel forward of said gripping teeth and defining a sidewall receiving space therebetween progressively diminishing rearward toward said chopper and anvil wheels.

15. The apparatus of claim 14 wherein each of said chopper wheel and anvil wheel conical guides includes an annular inwardly spiralling rib thereon for engagement and positive inward feeding of the sidewall regardless of irregularities in the leading end configuration thereof.

16. The apparatus of claim 4 wherein said chopper means comprises a rotatable chopper wheel and an adjacent counter rotatable anvil wheel, said chopper wheel including a forward sidewall slicing blade with a chopping cylinder immediately therebehind for sequential slitting of the sidewall into a continuous strip and chopping the strip into short segments.

17. The apparatus of claim 16 wherein said chopper wheel and anvil wheel rotate on parallel axes, said guide means comprising at least one guide rod laterally of and extending at an acute angle to said axes for guided introduction of the drum at an angle to the axes of the wheels for intersection of said chopper blade with the leading end of the drum sidewall at an acute angle thereto for subsequent slicing of said drum sidewall into a continuous helical strip.

18. The invention of claim 1 wherein each drum chime includes a crimp at the outer extremity thereof confining the outer extremity of the corresponding peripheral end portion of the sidewall; said cutter means including drive means for engaging the chime crimp and rotatably driving the drum as the sidewall is severed from the chime.

19. The invention of claim 18 wherein the drum includes at least one paperboard end header peripherally secured within a chime crimp; said cutter means being adapted for cutting engagement with the end header adjacent the chime crimp simultaneous with cutting engagement with said drum sidewall for a simultaneous severance of the sidewall and header from the chime, and pusher means selectively extendable for engagement with the end header and for forcibly initiating separation of the end header from the severed sidewall and chime.

20. The apparatus of claim 1 wherein said separator means includes a movably mounted separator arm forward of said cutter means, and means for moving said separator arm laterally relative to said cutter means into a cutter means engaged drum sidewall for effecting an inward creasing of the drum sidewall away from the chime and a corresponding axial movement of the sidewall away from the chime.

21. A method of recycling a drum having a paperboard sidewall with first and second metal chimes crimped to and about opposed first and second end portions of said sidewall; the method comprising severing said sidewall from said first chime, removing said first chime from said sidewall, severing said sidewall from said second chime, removing said second chime, helically cutting said sidewall into a continuous strip of predetermined width, and cutting said strip, immediately sequential to and during the formation thereof, into predetermined length segments.

22. The method of claim 21 wherein said drum includes a drum header crimped to one end portion of said sidewall by the corresponding chime; the method including severing said header from the corresponding chime as said sidewall is severed therefrom.

23. The method of claim 21 wherein removal of each chime includes laterally deforming said sidewall inward relative to said chime for exposure a portion of the chime for subsequent manual withdrawal.

24. The method of claim 23 wherein removal of each chime includes the step of axially shifting said sidewall away from the chime.

25. The method of claim 24 including the step of mechanically gripping and continuously feeding said sidewall independently of and simultaneously with the continuous cutting of the sidewall into a continuous helical strip.

26. The method of claim 25 including the step of partially unrolling each crimped chime prior to severing the sidewall from the chime, said severing being effected immediately adjacent the partially unrolled chime crimp.

27. The method of claim 21 including the step of partially unrolling each crimped chime prior to severing the sidewall from the chime, said severing being effected immediately adjacent the partially unrolled chime crimp.

28. The method of claim 22 including removing said header from the chime by inwardly deforming said header away from the chime and into the interior of the drum sidewall.

* * * * *